(12) United States Patent
Furlong et al.

(10) Patent No.: US 12,493,583 B1
(45) Date of Patent: Dec. 9, 2025

(54) SYSTEMS AND METHODS FOR IMPROVED DATABASE FUNCTIONALITY AND DATA TRANSLATION

(71) Applicant: Aiwyn, Inc., Charlotte, NC (US)

(72) Inventors: Chris Edward Furlong, Charlotte, NC (US); Justin Arthur Adams, Charlotte, NC (US); Ellen Choi, Charlotte, NC (US); Tanner John Fritz, Charlotte, NC (US); Patrick James Morrell, Charlotte, NC (US)

(73) Assignee: AIWYN, Inc., Charlotte, NC (US)

( * ) Notice: Subject to any disclaimer, the term of this patent is extended or adjusted under 35 U.S.C. 154(b) by 270 days.

(21) Appl. No.: 18/175,842

(22) Filed: Feb. 28, 2023

Related U.S. Application Data (60) Provisional application No. 63/315,264, filed on Mar. 1, 2022.

(51) Int. Cl.
*G06F 7/00* (2006.01)
*G06F 16/13* (2019.01)
*G06F 16/17* (2019.01)

(52) U.S. Cl.
CPC ........ *G06F 16/1727* (2019.01); *G06F 16/134* (2019.01)

(58) Field of Classification Search
CPC ............... G06F 16/1727; G06F 16/134; G06F 16/3344; G06F 9/54; G06F 16/235
USPC ....... 707/610, 613, 704, 736, 744, 807, 811, 707/999.001, 999.2, 600, 687, 803, 707/999.009, 999.01, 17.032
See application file for complete search history.

(56) References Cited

U.S. PATENT DOCUMENTS

| | | | | |
|---|---|---|---|---|
| 6,151,605 A | * | 11/2000 | Costa | G06F 9/44505 707/610 |
| 2016/0094681 A1 | * | 3/2016 | Wu | H04L 67/02 709/203 |
| 2018/0096001 A1 | * | 4/2018 | Soza | G06F 16/235 |
| 2023/0153723 A1 | * | 5/2023 | K | G06F 9/54 705/7.27 |

\* cited by examiner

*Primary Examiner* — Md I Uddin
(74) *Attorney, Agent, or Firm* — Bradley Arant Boult Cummings LLP; Daniel E. Sineway, Esq.

(57) ABSTRACT

The disclosed systems and methods can include receiving data files from various data sources to create a unified database. An appropriate configuration for the data files is determined. Each data file is parsed into cells and associated with an entity. The appropriate configuration is applied to the cells and the cells containing primary keys and foreign keys are identified. The related entities are linked via the foreign keys. The entities are aggregated based on the primary keys. Entities that are duplicates to the entities stored in the destination database are excluded from the aggregate and the aggregate is transmitted to the destination database.

16 Claims, 5 Drawing Sheets

SYSTEMS AND METHODS FOR IMPROVED DATABASE FUNCTIONALITY AND DATA TRANSLATION

PRIORITY TO RELATED APPLICATIONS

This application claims priority to and hereby incorporates by reference the following U.S. patent application: U.S. Provisional Patent Application Ser. No. 63/315,264, entitled "Systems and Processes for Improved Database Functionality and Data Translation," filed Mar. 1, 2022.

TECHNICAL FIELD

The present systems and processes relate generally to data science and translating data from a number of different data sources with varied formats and schemas into a unified database.

BACKGROUND

Businesses, organizations, non-profits, associations, and other legal entities (collectively referenced herein as "businesses") may organize data using a variety of formats and schemas. Businesses may have a disparate data sources that generate and modify data using a variety of techniques. Additionally, data from one source might depend on the data generated by a different source. Businesses may desire to organize all of their data from these disparate data sources into a single, unified database for data processing and analytics. However, due to the various formats and techniques used by these disparate data sources, organizing all of a business's data into a single, unified database can be difficult and time consuming. Moreover, manual conversion, unification, and/or organization (e.g., by a human) can be impractical due at least to the sheer volume and/or complexity of the disparate data sources.

Therefore, there is a long-felt but unresolved need for an automated system or process that can receive data from a variety of disparate data sources and create a single, unified database.

BRIEF SUMMARY OF THE DISCLOSURE

Briefly described, and according to one embodiment, aspects of the present disclosure generally relate to systems and processes for receiving data from a number of disparate data sources and creating a single unified database. According to various embodiments, the system can receive one or more data files from one or more data sources. As will be understood by those having ordinary skill in the art, the data files can be related to one or more entities (i.e., data structures associated with one or more fields).

According to various embodiments, the disclosed systems can determine an appropriate configuration for the data files. As will be understood by those with skill in the art, the configuration can define how data from the data files is organized in a destination data store.

According to various embodiments, the disclosed systems can parse the data files into individual cells. In various embodiments, the disclosed systems can apply the appropriate configuration to each cell. In various embodiments, the disclosed systems can identify which cells include foreign keys. The disclosed systems can identify the related entity that is linked to the particular entity associated with the cells via the foreign key.

According to various embodiments, the disclosed systems aggregate multiple entities together for transmission to the destination data store. In at least one embodiment, the disclosed systems extract the primary keys from each entity and aggregates all the entities with matching primary keys. In at least one embodiment, the disclosed systems will not transmit the aggregated entities to the destination data store until all required fields are present. In various embodiments, the disclosed system will exclude a particular entity from the aggregated entities if the particular entity would create a duplicate of the entity or an outdated version of the entity in the destination data store.

The above and further features of the disclosed systems and methods will be recognized from the following detailed descriptions and drawings of various embodiments. According to one embodiment, a computer-implemented method includes: A) receiving, via at least one computing device, one or more data files; B) determining, via the at least one computing device, a configuration for a data file from the one or more data files; C) parsing, via the at least one computing device, the data file into one or more cells; D) configuring the one or more cells, via the at least one computing device, based on the configuration; E) identifying, via the at least one computing device, one or more required fields in the one or more cells; F) extracting, via the at least one computing device, a first primary key from the one or more cells; G) aggregating the one or more cells into a message, via the at least one computing device, each of the one or more cells associated with the first primary key; H) determining, via the at least one computing device, that the one or more required fields are present; and I) transmitting, via the at least one computing device, the message to a destination data store for display on the at least one computing device.

Further, according to at least one embodiment, the computer-implemented method can include associating, via the at least one computing device, each of the one or more cells associated with the first primary key with a first entity of a plurality of entities.

Further, according to at least one embodiment, the computer-implemented method can include: A) identifying, via the at least one computing device, a foreign key in at least one of the one or more cells; and B) associating, via the at least one computing device, the foreign key with a second entity of the plurality of entities.

Further, according to at least one embodiment, the computer-implemented method can include: A) retrieving from the destination data store, via the at least one computing device, a second primary key associated with the second entity; and B) storing, via the at least one computing device, the second primary key in the one or more cells.

Further, according to at least one embodiment, the computer-implemented method can include determining, via the at least one computing device, that a stored entity in the destination data store has a stored primary key that matches the first primary key associated with the first entity.

Further, according to at least one embodiment, the computer-implemented method can include: A) determining, via the at least one computing device, one or more first fields in the first entity are identical to one or more stored fields in the stored entity; and B) excluding, via the at least one computing device, the first entity from the message.

Further, according to at least one embodiment, the computer-implemented method can include: A) determining, via the at least one computing device, a first timestamp associated with the first entity is older than a stored timestamp associated with the stored entity; and B) excluding, via the at least one computing device, the first entity from the message.

According to at least one embodiment, a system can include a destination data store; and at least one computing device in communication with the destination data store, wherein the at least one computing device is configured to: A) receive one or more data files; B) determine a configuration for a data file from the one or more data files; C) parse the data file into one or more cells; D) configure the one or more cells based on the configuration; E) identify one or more required fields in the one or more cells; F) extract a first primary key from the one or more cells; G) aggregate the one or more cells into a message, each of the one or more cells associated with the first primary key; H) determine that the one or more required fields are present; and I) transmit the message to a destination data store for display on the at least one computing device.

Further, according to at least one embodiment, the at least one computing device can be further configured to: A) associate a timestamp with each cell in the message; and B) associate each cell with a first entity of a plurality of entities based at least in part on the first primary key.

Further, according to at least one embodiment, the at least one computing device can be further configured to determine a field in the message includes two or more values, wherein the two or more values are associated with the one or more cells.

Further, according to at least one embodiment, the at least one computing device can be further configured to: A) determine a value of the two or more values is associated with a most recent timestamp; B) determine one or more older values of the two or more values are associated with older timestamps; and C) exclude the one or more older values from the two or more values.

Further, according to at least one embodiment, the at least one computing device can be further configured to: A) retrieve a second entity with a second primary key that matches the first primary key; and B) aggregate the second entity with the message.

Further, according to at least one embodiment, the at least one computing device can be further configured to assign an identifier to the first entity based at least in part on the first primary key.

According to at least one embodiment, a non-transitory computer-readable medium embodying a program that, when executed by one or more processors of at least one computing device, can cause the at least one computing device to: A) receive one or more data files; B) determine a configuration for a data file from the one or more data files; C) parse the data file into one or more cells; D) configure the one or more cells based on the configuration; E) identify one or more required fields in the one or more cells; F) extract a first primary key from the one or more cells; G) aggregate the one or more cells into a message, each of the one or more cells associated with the first primary key; H) determine that the one or more required fields are present; and I) transmit the message to a destination data store for display on the at least one computing device.

Further, according to at least one embodiment, the non-transitory computer-readable medium, when executed by the one or more processors, can further cause the at least one computing device to associate the one or more cells with a first entity of a plurality of entities, wherein the message includes the first entity.

Further, according to at least one embodiment, the non-transitory computer-readable medium, when executed by the one or more processors, can further cause the at least one computing device to: A) prior to transmitting the message to the destination data store, determine that a field of the one or more required fields is not present; and B) store the message in a cache.

Further, according to at least one embodiment, the non-transitory computer-readable medium, when executed by the one or more processors, can further cause the at least one computing device to upon determining that the field of the one or more required fields is present, retrieve the message from the cache.

Further, according to at least one embodiment, the non-transitory computer-readable medium, when executed by the one or more processors, can further cause the at least one computing device to: A) identify a foreign key in a cell of the one or more cells; B) associate the foreign key with a second entity of the plurality of entities; and C) determine that the first entity is dependent on the second entity.

Further, according to at least one embodiment, the non-transitory computer-readable medium, when executed by the one or more processors, can further cause the at least one computing device to aggregate the message with a plurality of messages into an aggregate of messages based at least in part on the first primary key.

Further, according to at least one embodiment, the non-transitory computer-readable medium, when executed by the one or more processors, can further cause the at least one computing device to determine that the aggregate of messages exceeds a threshold number of messages.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

Aspects of the present disclosure generally relate to systems and methods for receiving data from a number of disparate data sources and creating a single unified database. According to various embodiments, the system can receive one or more data files from one or more data sources. According to various embodiments, the data files from the data sources can be or include comma separated values files ("CSV") or other appropriate delimiter-separated value file type ("DSV). In other embodiments, the data files from data sources can be or include Excel files ("XLS") or other appropriate spreadsheet file type. As will be understood by those having ordinary skill in the art, the data files can be related to one or more entities (i.e., data structures associated with one or more fields).

As an example, a data file from the data sources can be a CSV file. A row from the CSV file can represent an entity and each value in the row can be a field associated with the entity. In this example, the data files from the data sources can be related to a professional services business. Further, in this example, entities can represent a client, an engagement for a particular client, staff data for a particular engagement, time entries for a particular engagement, an invoice for a particular engagement, or any other data related to a client or engagement. In one example, an entity can be a client. In this example, fields such as "client number," "accounts receivable balance," or "phone number" can be contained within this entity.

According to various embodiments, the disclosed systems can determine an appropriate configuration for the data files. As will be understood by those with skill in the art, the configuration can define how data from the data files is organized in a destination data store. In at least one embodiment, the disclosed systems can determine the appropriate configuration for a data file based on one or more attributes of the data file, such as the name of the data file, the type of data file, or the date the data file was created or last modified. In at least one embodiment, the disclosed systems can determine that all data files with the same file name should have the same configuration applied. In various embodiments, the configurations that can be applied to the data files can include, but are not limited to, applying various data transformation techniques and methodologies to values in a data file, specifying certain fields within a data file as required fields, defining certain fields within a data file as a primary key or foreign key, and assigning an order to each entity.

As will be understood by one having ordinary skill in the art, a primary key can be a field that uniquely identifies an entity associated with a data file. In other words, each entity will have a unique value listed for the primary key. In at least one embodiment, the primary key can be more than one field. In at least one embodiment, every entity associated with a data file from the data sources will have a primary key. As will be understood by one having ordinary skill in the art, a foreign key can be a field that links one or more related entities together. To indicate that certain entities are related, each of the related entities can be associated with a common foreign key. For example, Entity A found in a data file provided by the data sources can have a foreign key that links Entity A to Entity B stored in the destination data store, with Entity B having the same foreign key as Entity A.

According to various embodiments, the disclosed systems can parse the data files into individual cells. In at least one embodiment, the data file can be a CSV file. In this embodiment, the disclosed systems can separate the CSV file into individual rows and associate each row with an entity. In at least one embodiment, the disclosed system can associate a row with a particular entity based on a primary key (i.e., a primary key found within the row) that is associated with the particular entity. In various embodiments, the disclosed systems can apply the appropriate configuration to each cell.

In various embodiments, the disclosed systems can identify which cells include foreign keys. The disclosed systems can identify the related entity that is linked to the particular entity associated with the cells via the foreign key.

According to various embodiments, the disclosed systems aggregate multiple entities together for transmission to the destination data store. In at least one embodiment, the disclosed systems extract the primary keys from each entity and aggregates all the entities with matching primary keys. In at least one embodiment, the disclosed systems will not transmit the aggregated entities to the destination data store until all required fields are present. In various embodiments, the disclosed system will exclude a particular entity from the aggregated entities if the particular entity would create a duplicate of the entity or an outdated version of the entity in the destination data store.

Exemplary Embodiments

Figure 1:
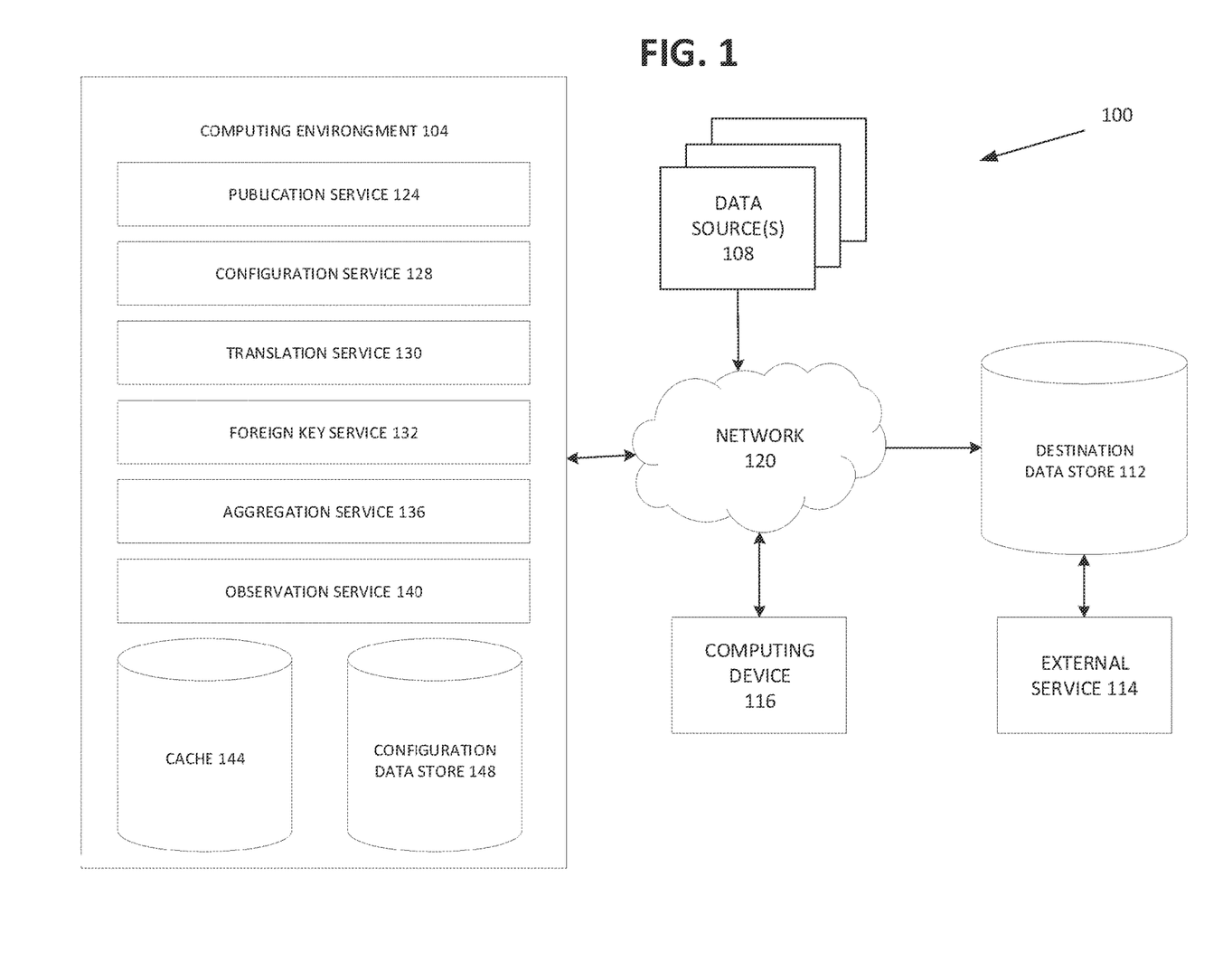
FIG. 1 illustrates an exemplary networked environment for the disclosed system.

Referring now to the figures, for the purposes of example and explanation of the fundamental processes and components of the disclosed systems and processes, reference is made to FIG. 1, which illustrates an exemplary networked environment 100 for the data configuration and translation systems and processes disclosed herein. As will be understood and appreciated, the exemplary networked environment 100 shown in FIG. 1 represents merely one approach or embodiment of the present system, and other aspects are used according to various embodiments of the present system.

FIG. 1 shows an exemplary networked environment 100 for the data configuration and translation systems and processes. The networked environment 100 can include, but is not limited to, a computing environment 104, one or more data sources 108, one or more destination data stores 112, one or more external services 114, and one or more computing devices 116 connected over a network 120.

According to one embodiment, the computing environment 104 can include, but is not limited to, a publication service 124, a configuration service 128, a foreign key service 132, an aggregation service 136, an observation service 140, one or more caches 144, and a configuration data store 148. The elements of the computing environment 104 can be provided via a plurality of computing devices that may be arranged, for example, in one or more server banks or computer banks or other arrangements. Such computing devices can be located in a single installation or may be distributed among many different geographical locations (e.g., in one or more remote locations). For example, the computing environment 104 can include a plurality of computing devices that together may include a hosted computing resource, a grid computing resource, or any other distributed computing arrangement. In some cases, the computing environment 104 can correspond to an elastic computing resource where the allotted capacity of processing, network, storage, or other computing-related resources may vary over time. Regardless, the computing environment 104 can include one or more processors and memory having instructions stored thereon that, when executed by the one or more processors, cause the computing environment 104 to perform one, some, or all of the actions, methods, steps, or functionalities provided herein.

In various embodiments, the data sources 108 can be sources of data files related to one or more entities to the computing environment 104. According to various embodiments, the data files from the data sources 108 can be comma separated values files ("CSV") or other appropriate delimiter-separated value file type ("DSV). In other embodiments, the data files from data sources 108 can be Excel files ("XLS") or other appropriate spreadsheet file type. As will be understood by one having ordinary skill in the art, entities are data structures with one or more fields. In various embodiments, a single data file can be associated with one or more entities associated with one or more fields. As an example, a data file from the data sources 108 can be a CSV file. A row from the CSV file can represent an entity and each value in the row can be a field associated with the entity. In various embodiments, entities can represent a client, an engagement for a particular client, staff data for a particular engagement, time entries for a particular engagement, an invoice for a particular engagement, or any other data related to a client or engagement. In one example, an entity can be a client. In this example, fields such as "client number," "accounts receivable balance," or "phone number" can be contained within this entity.

In various embodiments, the data sources 108 generally refers to internal or external or internal systems, pages, databases, or other platforms from which various data can be received or collected. Non-limiting examples of the data sources 108 can include internal file systems, email systems, accounting systems, financial systems, payment systems, and publicly-available databases (e.g., court filing databases, company information databases, state business registration databases, credit bureau databases).

In one example, the data source 108 can include a network cloud storage service from which computing environment 104 may receive or retrieve files related to a particular entity via the network 120. In another example, the data source 108 can include an internal file system from which the computing environment 104 may receive or retrieve files related to a particular entity. In another example, the data source 108 can include an accounting system from which the computing environment 104 may receive or retrieve files with accounting data related to a particular entity. In another example, the data source 108 can include an email system from which the computing environment 104 may receive or retrieve email files with data related to a particular entity. In another example, the data source 108 can include a publicly-available database from which the computing environment 104 may receive or retrieve files related to a particular entity.

In various embodiments, the exemplary networked environment 100 can include one or more destination data stores 112. According to various embodiments, the data store 112 can be in communication with an external service 114. As will be further discussed herein, the computing environment 104 applies various data processing techniques to the entities associated with the data files provided by the data sources 108. Once processing is complete, the entities are stored in the destination data store 112 for use by the external service 114.

As stated, in various embodiments, the computing environment 104 includes, but is not limited to, a publication service 124, a configuration service 128, a foreign key service 132, an aggregation service 136, an observation service 140, one or more caches 144, and the configuration data store 148. In various embodiments, the publication service 124 can use various data synchronization method or data integration methods to retrieve or receive data files from the data sources 108. In various embodiments, the publication service 124 can use appropriate data synchronization methods such as, but not limited to, high watermark data synchronization, change data capture methods, or change data tracking methods. In various embodiments, the publication service 124 can retrieve or receive data files from the data sources 108 at a periodic interval (e.g., every 30 minutes, every 6 hours, every 3 days). In another embodiment, the publication service 124 monitors the data sources 108 for new data files as well as changes to files and may request data files from data sources 108 as appropriate.

In some embodiments, the publication service 124 can be configured to receive data input from computing device 116. In one embodiment, the computing device 116 may be used to retrieve, modify, or request files from the data sources 108.

According to various embodiments, the publication service 124 can publish messages to the other services within the computing environment 104 whenever new data files are available or received from the data sources 108. As an example, the computing device 116 can be used to upload a data file to a data source 108 such as a network cloud storage service. The publication service 124 can publish a message to the other services within the computing environment 104 when the new data file is uploaded to the data source 108.

In various embodiments, the configuration service 128 can determine the appropriate configuration for the data files received or retrieved by the publication service 124. As will be understood by those with skill in the art, the appropriate configuration identified by the configuration service 128 can define how data from the data files is organized in destination data store 112.

In at least one embodiment, the configuration service 128 can receive a message from the publication service 124 that a particular data file is available. In various embodiments, the configuration service 128 can determine the appropriate configuration that should be applied to the particular data file. According to various embodiments, the configuration service 128 can determine the appropriate configuration for a data file based on the name of the data file, the type of data file, or the date the data file was created or last modified. In at least one embodiment, the configuration service 128 can determine that all data files with the same file name, file name convention, or file name pattern should have the same configuration applied. In various embodiments, the configurations that can be applied to the data files can include, but are not limited to, applying various data transformation techniques and methodologies to one or more values in a data file, specifying certain fields within a data file as required fields (e.g., identifying that a required data field does not include the corresponding data), identifying or defining certain fields within a data file as a primary key or foreign key, applying conditional logic to the values in the data file, assigning an order to each entity, and defining entities as dependent on a different entity. In various embodiments, the configuration service 128 can store the configurations in the configuration data store 148 so that the other services in the computing environment 104 can access the configurations.

In various embodiments, the configurations can include data transformation techniques and methodologies. According to several embodiments, these data transformation techniques and methodologies can include, but are not limited to conditional logic rules, standardization, scaling, imputing, sampling, encoding, and normalization. In one example, the configuration service 128 can set any value below zero to zero. In another example, the configuration service 128 can use imputing to estimate missing values in a data file. In another example, the configuration service 128 may balance the data within a data file by undersampling or oversampling. In another example, the configuration service 128 may use encoding to transform categorical values in a data file into numerical values. In this example, the configuration service 128 may use base n encoding, leave-one-out encoding, one-hot encoding, or hashing to encode data contained within a data file. In another example, the configuration service 128 may scale data contained within a data file to standardize the range and scale of the data using standard scaling or min-max scaling techniques.

In various embodiments, the configurations can also include specifying certain fields within a data file as required fields. As will be discussed further herein, any entity with values missing from the required fields will be held during processing until all required fields are present (e.g., the data corresponding to a required field is received from data sources 108). According to various embodiments, any field that is not required is an optional field.

In various embodiments, the configurations can also include defining or identifying certain fields within a data file as a primary key or foreign key. As will be understood by one having ordinary skill in the art, a primary key can be a field that uniquely identifies an entity associated with a data file. In other words, each entity will have a unique value listed for the primary key. In at least one embodiment, the primary key can be more than one field. In at least one embodiment, every entity associated with a data file from the data sources 108 will have a primary key. According to various embodiments, a user can define which fields include a primary key. In at least one embodiment, the configuration service 128 will define certain fields as primary keys based on which data source 108 that the data file originated from. As will be understood by one having ordinary skill in the art, a foreign key can be a field that links one or more related entities together. For example, Entity A found in a data file provided by the data sources 108 can have a foreign key that links Entity A to Entity B stored in the destination data store 112, with Entity B having the same foreign key as Entity A. In this example, once Entity A and Entity B are linked by the same foreign keys, the fields associated with Entity A can be associated with Entity B, thus providing or attributing additional fields with additional values from Entity A to Entity B. According to various embodiments, a user can define which fields include a foreign key and which entity is related. In at least one embodiment, the configuration service 128 will define certain fields as foreign keys based on which data source 108 that the data file originated from.

In various embodiments, the configurations can also include applying conditional logic to the values in the data file. In at least one embodiment, the configuration can include setting any value that is less than zero to zero. In at least one embodiment, the configuration can include deleting invalid email addresses. In at least one embodiment, the configuration can include changing zero values to null. In at least one embodiment, the configuration can include separating two identifiers stored in the same field. As an example, an invoice number and a payment reference number can be stored in the same field. In this example, the configuration would separate the invoice number and payment reference number into two separate fields.

In various embodiments, the configurations can also include assigning an order to the entities in a data file. According to various embodiments, entities can be processed based on their order (e.g., entities with a lower order can be processed before entities with a higher order, entities can be processed in ascending order). In at least one embodiment, an entity with a high order will be dependent on an entity with a lower order. In at least one embodiment, a system user can assign an order to each entity in a data file.

In various embodiments, the configurations can also include defining certain entities as dependent on different entities. As an illustrative example, Entity A has a required field that is also a foreign key with Entity B (i.e., Entity A is dependent on Entity B). Said another way, Entity B has the value that is needed for the required field in Entity A. Since Entity A is dependent on Entity B, in this example, processing Entity A before processing Entity B can have a detrimental effect on performance of the entire system disclosed herein. Therefore, the translation service 130 could not complete processing of Entity A prior to processing Entity B (i.e., Entity A could not be transmitted to the destination data store 112 prior to Entity B being transmitted to the destination data store 112). According to various embodiments, a user can define which entities are dependent on different entities. In at least one embodiment, the configuration service 128 will define which entities are dependent on different entities based on which data source 108 that the data file originated from.

In various embodiments, the translation service 130 can parse the data file into cells and associate each cell with an entity. According to various embodiments, the translation service 130 can also apply the configuration to cells based on the appropriate configuration determined by the configuration service 128. Additionally, in at least one embodiment, the translation service 130 can determine if dependent entities have completed processing.

According to various embodiments, the translation service 130 can parse the data file into individual cells. In at least one embodiment, the data file can be a CSV file. In this embodiment, the translation service 130 can separate the CSV file into individual rows. The translation service 130 can associate each row from the CSV file with an entity. In at least one embodiment, the translation service 130 can associate a row with a particular entity based on a primary key (e.g., a primary key found within the row) that is associated with the particular entity. In this embodiment, the translation service 130 can break the row into individual cells and can associate each cell with a field associated with the particular entity. In various embodiments, the translation service 130 can associate a timestamp with each cell that indicates the version of the data contained within the cell. In various embodiments, the translation service 130 can apply the appropriate configuration determined by the configuration service 128 to the cell. In various embodiments, once the translation service 130 applies the appropriate configuration to the cell, the translation service 130 sends the cell to the foreign key service 132.

According to at least one embodiment, the translation service 130 can determine if dependent entities have completed processing. As an illustrative example, Entity A has a required field that is also a foreign key with Entity B (i.e., Entity A is dependent on Entity B). Said another way, Entity B has the value that is needed for the required field in Entity A. Since Entity A is dependent on Entity B, in this example, processing Entity A before processing Entity B can have a detrimental effect on performance of the entire system disclosed herein. Therefore, the translation service 130 could not complete processing of Entity A prior to processing Entity B (i.e., Entity A could not be transmitted to the destination data store 112 prior to Entity B being transmitted to the destination data store 112). However, in this example, the translation service 130 could complete processing of Entity B prior to processing Entity A. Determining if dependent entities have completed processing allows the translation service 130 to address the issue from this illustrative example.

According to at least one embodiment, the translation service 130 can determine if dependent entities have completed processing by determining if a particular configuration has been previously applied to a data file. As will be discussed further herein, if a particular configuration has been previously applied to a data file, the translation service 130 can assume that all dependent entities have completed processing. If a particular configuration has not been previously applied to a data file, the translation service 130 can determine if dependent entities have completed processing. If the dependent entities have not completed processing, the translation service 130 can store the data file in the one or more caches 144 until the dependent entities have completed processing.

In various embodiments, the foreign key service 132 can identify which cells include foreign keys. As will be understood by one having ordinary skill in the art, a foreign key can be a field that links one or more related entities together. According to various embodiments, when the foreign key service 132 identifies a cell containing a foreign key, the foreign key service 132 can associate the foreign key with the particular entity. Once the foreign key service 132 associates the foreign key with the particular entity, the foreign key service 132 can identify the related entity that is linked to the particular entity via the foreign key. In various embodiments, the foreign key service 132 can determine if the related entity exists in the one or more destination data stores 112. If the related entity does exist in the destination data stores 112, the foreign key service 132 sends the particular entity to the aggregation service 136. If the related entity does not exist in the destination data stores 112, then foreign key service 132 can store the particular entity in the one or more caches 144 until the related entity exists in the destination data stores 112.

According to various embodiments, the aggregation service 136 aggregates multiple entities together for transmission to the destination data stores 112. In at least one embodiment, the aggregation service 136 extracts the primary keys from each entity and aggregates all the entities with matching primary keys. If, after aggregation, one field has more than one value, the aggregation service 136 can remove the older values so that only the most recent value remains. In various embodiments, the aggregation service 136 determines whether the aggregated entities are ready for transmission to the destination data stores 112. In at least one embodiment, the aggregated entities are ready for transmission to the destination data stores 112 when all required fields in the entities are present. In at least one embodiment, the aggregated entities are ready for transmission if the aggregated entities already exist in the destination data store 112. In at least one embodiment, if the aggregated entities are not ready for transmission to the destination data stores 112 (e.g., if another entity from which a particular entity depends has not yet been processed, if a related entity that a particular entity shares a foreign key with has not yet been processed), the aggregation service 136 can store the entities in the caches 144. According to various embodiments, once the aggregated entities are ready for transmission, the aggregation service 136 can transmit the aggregated entities to the destination data store 112 via the network 120. In at least one embodiment, once the aggregation service 136 has transmitted the aggregated entities to the destination data store 112, the external service 114 can access the aggregated entities.

In various embodiments, the aggregation service 136 will exclude a particular entity from the aggregated entities if the particular entity would create a duplicate of the entity or an outdated version of the entity in the destination data store 112. According to various embodiments, the aggregation service 136 will exclude a particular entity from the aggregated entities if the particular entity is identical to an entity in the destination data store 112 (i.e., all of the fields between the two entities are identical). In various embodiments, the aggregation service 136 will exclude a particular entity from the aggregated entities if the particular entity is an older version of the entity in the destination data store 112.

In various embodiments, the observation service 140 can notify the other services in the computing environment 104 when a data file or entity is ready to be removed from cache and for further processing. According to various embodiments, data files or entities can be stored in cache until they are ready for further processing. In various embodiments, the observation service 140 monitors transmission of entities between the services in the computing environment 104 and the destination data stores 112. When a particular entity has been transmitted between the services or to the destination data stores 112, observation service 140 can check the cache 144 to determine if a data file or entity stored in cache was waiting on the particular entity to be transmitted (i.e., the stored data file or entity could not be processed further until the particular entity had been processed).

In various embodiments, the one or more caches 144 can store data files or entities until those data files or entities are ready for further processing. In at least one embodiment, cache 144 is a Redis cache, Caffeine cache, or some other appropriate cache.

According to various embodiments, computing device 116 can be any device capable of accessing network 209 including, but not limited to, a computer, smartphone, tablets, or other device. Computing device 116 can include a processor and memory. Computing device 116 can include a display on which various user interfaces can be rendered to allow users to configure, monitor, control, and command various functions of networked environment 100. In various embodiments, computing device 116 can include multiple computing devices. Regardless, the computing device 116 can include one or more processors and memory having instructions stored thereon that, when executed by the one or more processors, cause the computing device 116 to perform one, some, or all of the actions, methods, steps, or functionalities provided herein.

The network 120 includes, for example, the Internet, intranets, extranets, wide area networks (WANs), local area networks (LANs), wired networks, wireless networks, or other suitable networks, etc., or any combination of two or more such networks.

Figure 2:
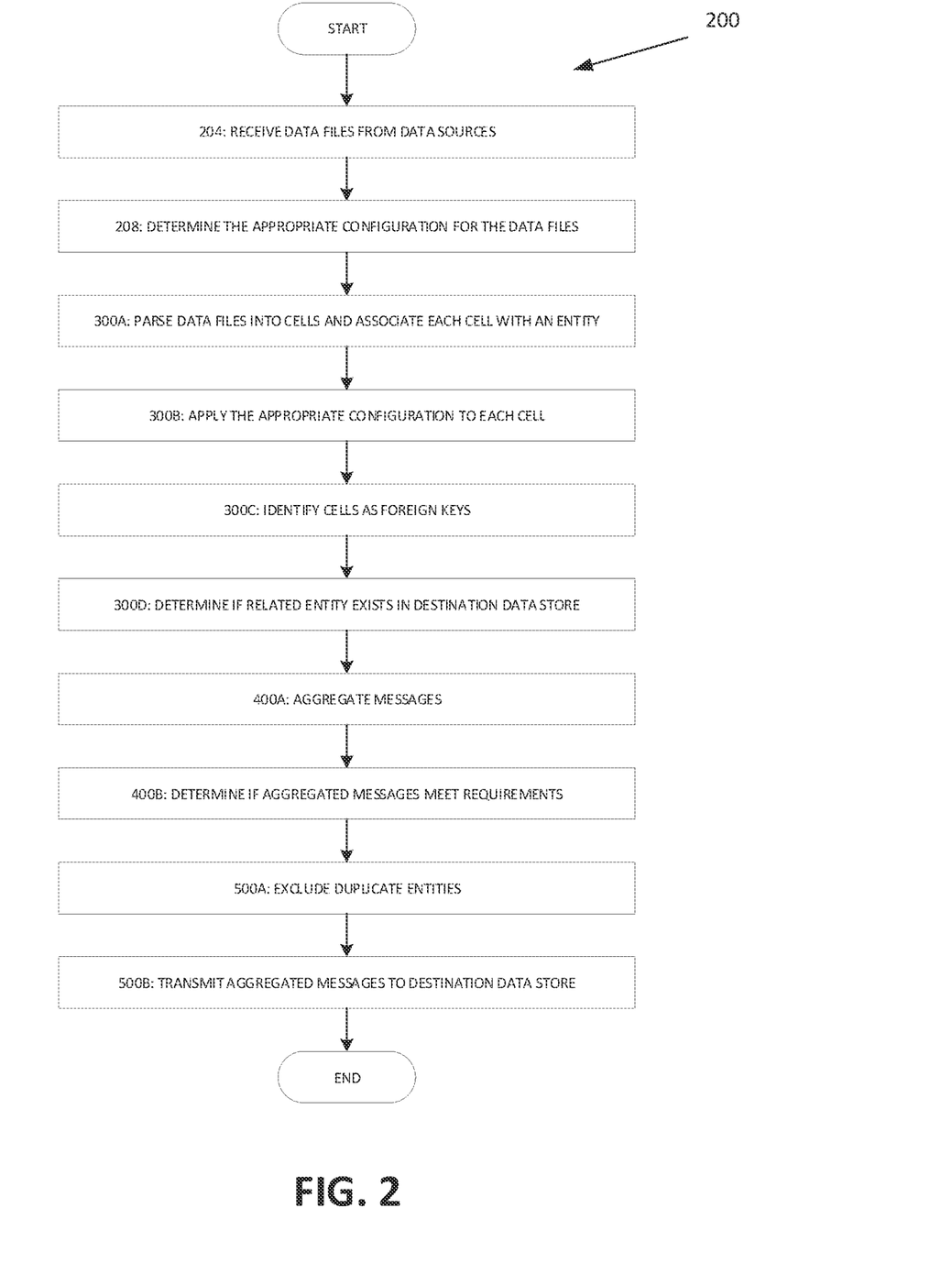
FIG. 2 illustrates an exemplary overall process for the disclosed system.

Referring now to FIG. 2, FIG. 2 shows an exemplary, high-level overview process 200 according to one embodiment of the present disclosure. As will be understood by one having ordinary skill in the art, the steps and processes shown in FIG. 2 (and those of all other flowcharts and sequence diagrams shown and described herein) may operate concurrently and continuously, are generally asynchronous and independent, and are not necessarily performed in the order shown.

In various embodiments, step 204 can include receiving one or more data files from the data sources 108. According to various embodiments, and with reference to FIG. 1, the publication service 124 can receive the data files from the data sources 108. In various embodiments, the data files can be comma separated values files ("CSV") or other appropriate delimiter-separated value file type ("DSV"). In other embodiments, the data files can be Excel files ("XLS") or other appropriate spreadsheet file type. In various embodiments, the publication service 124 can use various data synchronization method or data integration methods to retrieve or receive data files from the data sources 108. In various embodiments, the publication service 124 can use appropriate data synchronization methods such as, but not limited to, high watermark data synchronization, change data capture methods, or change data tracking methods.

In various embodiments, step 208 can include determining the appropriate configuration for the data files. In various embodiments, the configuration service 128 can determine the appropriate configuration for the data files. As will be understood by those with skill in the art, the appropriate configuration can define how data from the data files is organized in destination data store 112. According to various embodiments, the appropriate configuration can be identified based on the name of the data file, the type of data file, or the date the data file was created or last modified. In at least one embodiment, the configuration service 128 can determine that all data files with the same file name, file naming convention, or file name pattern should have the same configuration applied. In various embodiments, the configurations that can be applied to the data files can include, but are not limited to, applying various data transformation techniques and methodologies to values in a data file, specifying certain fields within a data file as required fields, defining certain fields within a data file as a primary key or foreign key, and assigning an order to each entity.

Figure 3:
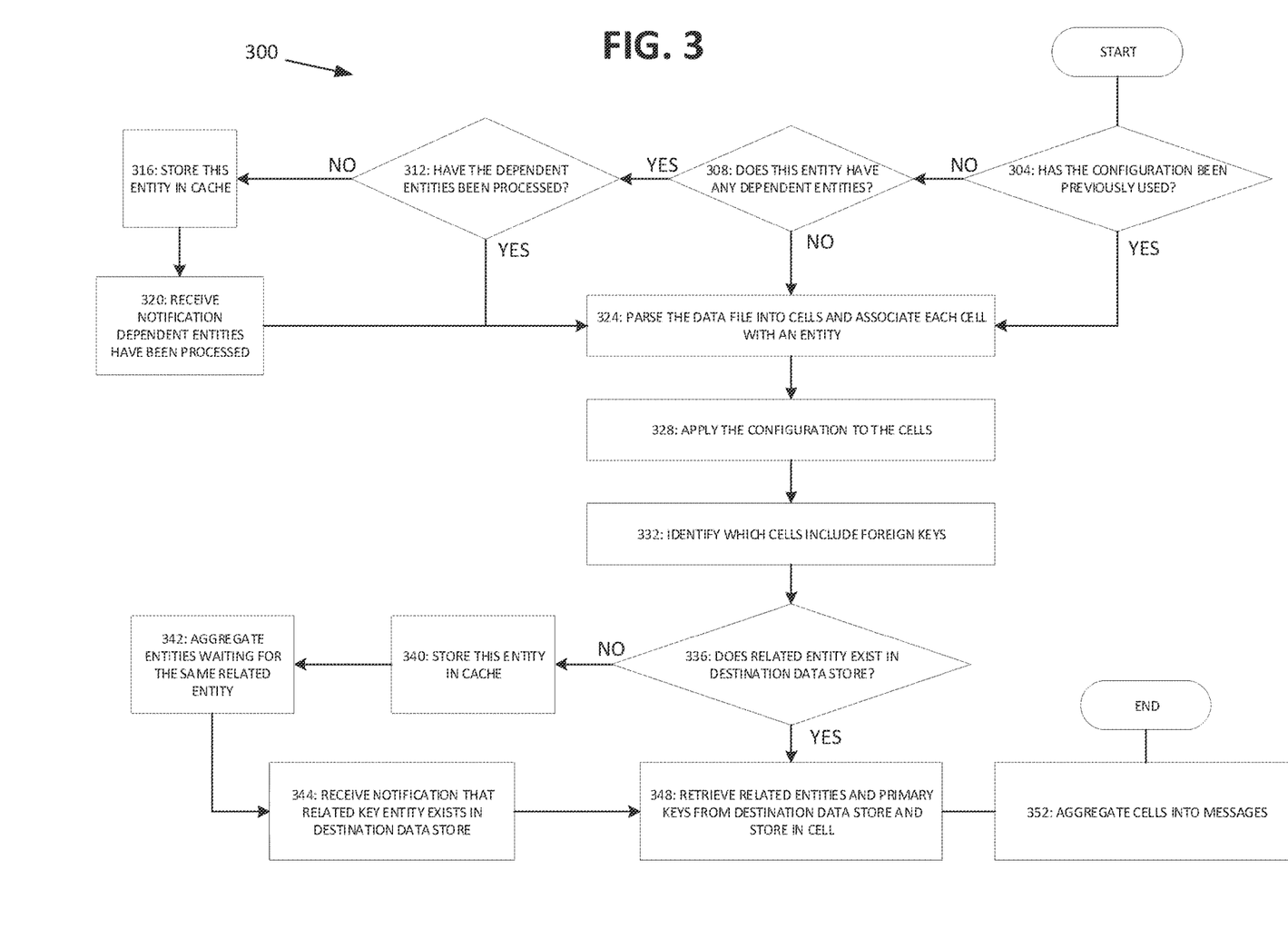
FIG. 3 illustrates an exemplary process for parsing data files, applying a configuration to the parsed cells, and identifying foreign keys.

In various embodiments and to be discussed further in reference to FIG. 3, step 300A can include parsing the data files into cells and associating each cell with a corresponding entity. In various embodiments, the translation service 130 can parse the data file into individual cells. In at least one embodiment, the data file can be a CSV file. In this embodiment, the CSV file can be broken into individual rows. Each row in the CSV file can be associated with an entity. In at least one embodiment, a row can be associated with a particular entity based on a primary key (i.e., a primary key found within the row) that is associated with the particular entity. In various embodiments, each row can be broken into individual cells and each cell can be associated with a field associated with the particular entity. In various embodiments, a timestamp can be associated with each cell that indicates the version of the data contained within the cell.

In various embodiments and to be discussed further in reference to FIG. 3, step 300B can include applying the appropriate configuration to each cell. In various embodiments, the translation service 130 can apply the appropriate configuration determined by the configuration service 128 to the cell.

In various embodiments and to be discussed further in reference to FIG. 3, step 300C can include identifying cells as foreign keys. In various embodiments, the foreign key service 132 can identify which cells include foreign keys. As will be understood by one having ordinary skill in the art, a foreign key can be a field that links one or more related entities together. According to various embodiments, when a cell is identified as containing a foreign key, the foreign key can be associated with the particular entity. The related entity that is linked to the particular via the foreign key can also be identified.

In various embodiments and to be discussed further in reference to FIG. 3, step 300D can include determining if the related entity exists in the destination data store. According to various embodiments, the foreign key service 132 can determine if the related entity exists in the one or more destination data stores 112. As will be discussed further in relation to FIG. 3, if the related entity does exist in the destination data stores, the particular entity can be stored in cache until the related entity exists in the destination data stores. If the related entity does exist in the destination data stores, the cells associated with the particular entity can be merged together to form messages In various embodiments and to be discussed further in reference to FIG. 4, step 400A can include aggregating messages from the same entities together. According to various embodiments, the aggregation service 136 can aggregate messages for the same entities together. In at least one embodiment, the primary key can be extracted for each entity and all the entities with the same primary key are aggregated together. In this embodiment, the entities with the same primary key are retrieved from cache and aggregated together. In various embodiments, once multiple entities are aggregated, a field can contain multiple values. In at least one embodiment, step 400A can include removing older values so that only the most recent value remains.

Figure 4:
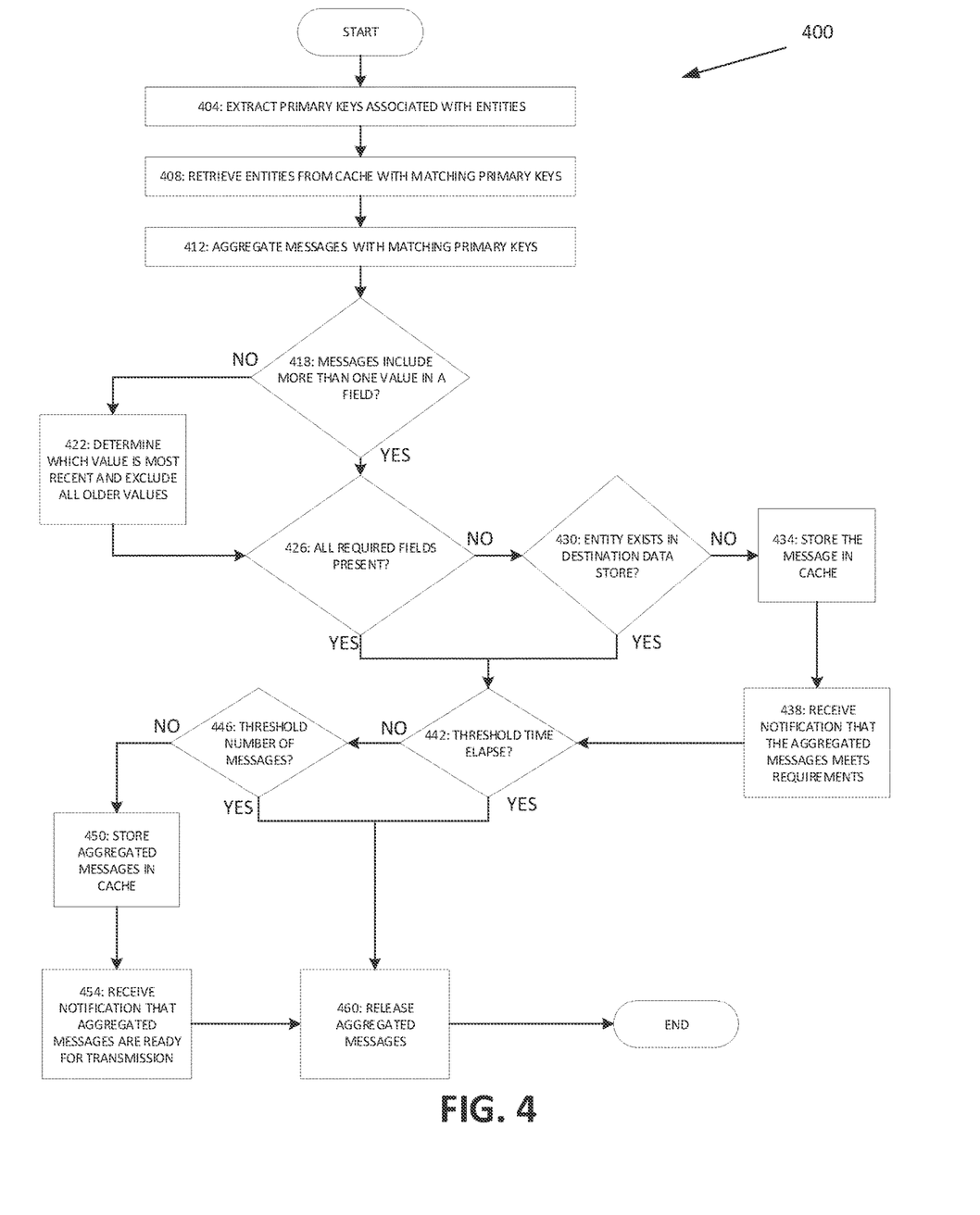
FIG. 4 illustrates an exemplary process for aggregating messages and determining if the aggregated messages meet the requirements for transmission to a destination data store.

In various embodiments, step 400B can include determining if the aggregated messages meet the requirements for transmission to the destination data stores. In various embodiments, the aggregation service 136 determines whether the aggregated entities are ready for transmission to the destination data stores 112. In at least one embodiment, the aggregated entities are ready for transmission to the destination data stores when all required fields in the entities are present. In at least one embodiment, the aggregated entities are ready for transmission if the aggregated entities already exist in the destination data store. In at least one embodiment, if the aggregated entities are not ready for transmission to the destination data stores, the aggregated entities are stored in cache until they are ready for transmission to the destination data stores.

Figure 5:
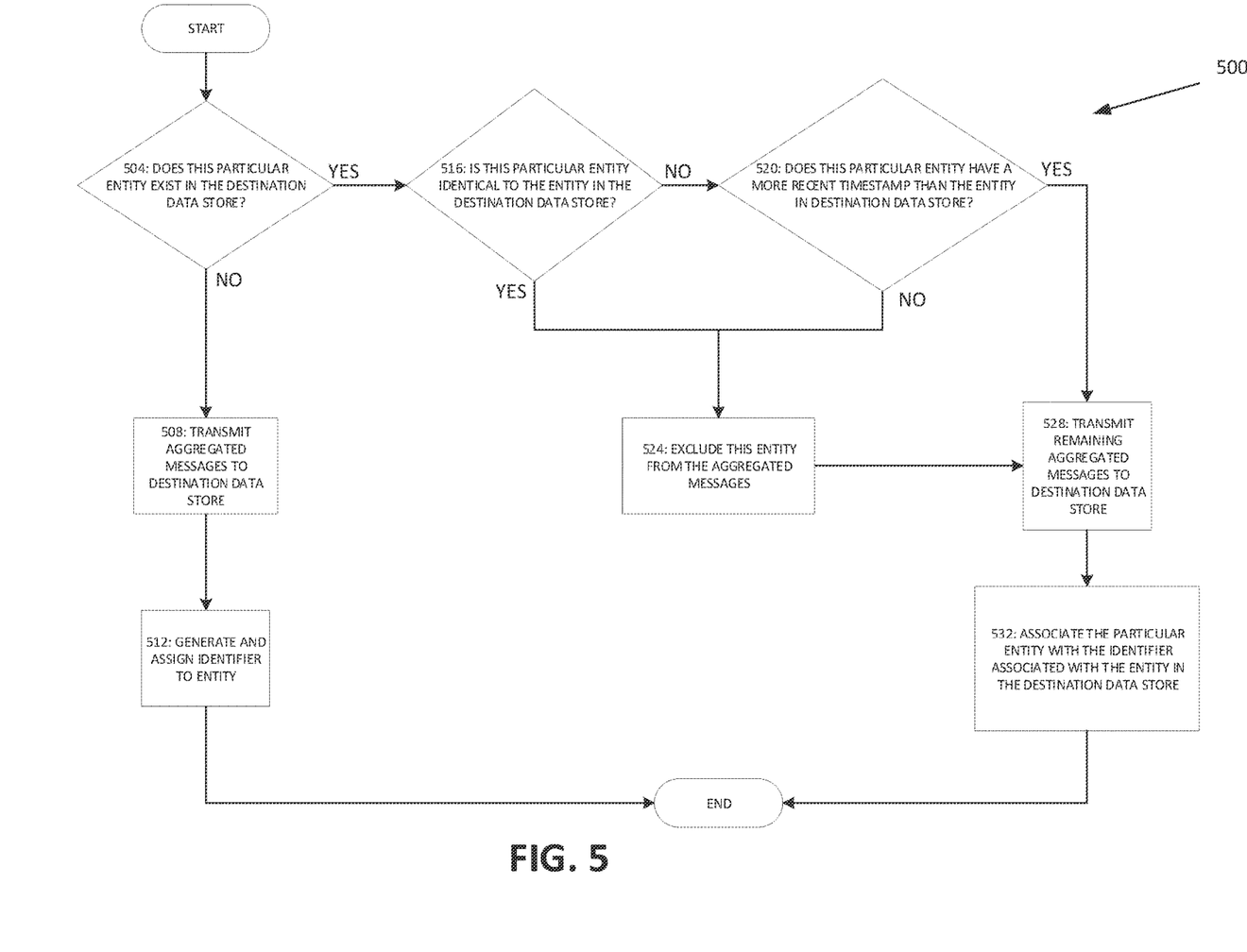
FIG. 5 illustrates an exemplary process for excluding duplicate entities from the aggregated messages and transmitting the resulting aggregated messages to the destination data store

In various embodiments and to be discussed further in reference to FIG. 5, step 500A can include excluding a particular entity from the aggregated entities if the particular entity would create a duplicate of the entity or an outdated version of the entity in the destination data stores. According to various embodiments, the aggregation service 136 will exclude a particular entity if the particular entity would create a duplicate of the entity or an outdated version of the entity in the destination data stores. In at least one embodiment, the particular entity can be excluded from the aggregated entities if the particular entity is identical to an entity in the destination data store (i.e., all of the fields between the two entities are identical). In at least one embodiment, the particular entity can be excluded from the aggregated entities if the particular entity is an older version of the entity in the destination data store.

In various embodiments, step 500B can include transmitting the aggregated entities to the destination data stores. According to various embodiments, once the aggregated entities are ready for transmission, the aggregation service 136 can transmit the aggregated entities to the destination data store 112 via the network 120. In at least one embodiment, once the aggregated entities have been transmitted to the destination data stores, an external service can access the aggregated entities via the destination data store. In various embodiments, once the aggregated entities have been transmitted to the destination data store, the destination data store can generate and assign an identifier to each entity.

Referring now to FIG. 3, an exemplary process 300 for parsing the data files, applying the configuration to the parsed cells, and identifying foreign keys is shown. In various embodiments, process 300 can also include determining if dependent entities have been processed. As an illustrative example, Entity A has a required field that is a foreign key associated with Entity B (i.e., Entity A is dependent on Entity B). Said another way, Entity B has the value that that is needed for the required field in Entity A. Since Entity A is dependent on Entity B, in this example, the systems disclosed herein could not complete processing of Entity A prior to processing Entity B (i.e., Entity A could not be transmitted to the destination data store prior to Entity B being transmitted to the destination data store).

In various embodiments, step 304 can include determining if the appropriate configuration has been previously applied to a different data file previously processed by process 300. As discussed with reference to both FIGS. 1 and 2, after receiving the data files from the data sources 108, the configuration service 128 can determine the appropriate configuration for the data files. In various embodiments, the translation service 130 can determine if the appropriate configuration has been previously applied to data file. When the appropriate configuration has been previously applied to a data file, the systems disclosed herein can assume that all dependent entities have completed processing and process 300 can proceed to step 324. If the appropriate configuration has not been previously applied to a data file, dependent entities may not have completed processing and process 300 can proceed to step 308.

In various embodiments, step 308 can include determining if the particular entity at issue has any dependent entities. According to various embodiments, the translation service 130 can determine if the particular entity has any dependent entities. According to at least one embodiment, translation service 130 can determine if the particular entity has any dependent entities if the particular entity has a required field that is also a foreign key with a different entity (i.e., the dependent entity). In at least one embodiment, the particular entity does not have any dependent entities and process 300 can proceed to step 324. In at least one embodiment, process 300 can proceed to step 312 if the particular entity does have dependent entities.

In various embodiments, step 312 can include determining if the dependent entities have been processed (i.e., have the dependent entities been transmitted to the destination data store). According to various embodiments, the translation service 130 can determine if the dependent entities have been processed. In at least one embodiment, the dependent entities have been processed and process 300 can proceed to step 324. In at least one embodiment, the dependent entities have been processed and process 300 can proceed to step 316.

In various embodiments, step 316 can include storing the particular entity in cache. According to various embodiments, the translation service 130 can store the particular entity in cache 144. In at least one embodiment, step 316 can include storing the entire data file, as opposed to a single, particular entity, in cache. In various embodiments, the entity or data file will remain in cache until the dependent entities have been transmitted to the destination data store.

In various embodiments, step 320 can include receiving a notification that the dependent entities have been processed. According to various embodiments, the observation service 140 can notify the translation service 130 that the dependent entities have been transmitted to the destination data stores 112. In at least one embodiment, once the dependent entities have been transmitted to the destination data stores 112, the observation service 140 can check cache 144 to determine if a stored data file or entity was dependent on the dependent entities. In various embodiments, once receiving the notification, the stored data files or entities can be released from cache and process 300 can proceed to step 324.

In various embodiments, step 324 can include parsing the data files into individual cells and associating each cell with an entity. In various embodiments, the translation service 130 can parse the data file into individual cells. In at least one embodiment, the data file can be a CSV file. In this embodiment, the CSV file can be broken into individual rows. Each row in the CSV file can be associated with an entity. In at least one embodiment, a row can be associated with a particular entity based on a primary key (i.e., a primary key found within the row) that is associated with the particular entity. In various embodiments, each row can be broken into individual cells and each cell can be associated with a field associated with the particular entity. In various embodiments, a timestamp can be associated with each cell that indicates the version of the data contained within the cell.

In various embodiments, step 328 can include applying the appropriate configuration to each cell. In various embodiments, the translation service 130 can apply the appropriate configuration determined by the configuration service 128 to the cell. As will be understood by those with skill in the art, the appropriate configuration identified can define how data from the data files is organized in destination data store. As discussed with reference to FIGS. 1 and 2, the configurations that can be applied to the cells can include, but are not limited to, applying various data transformation techniques and methodologies to values in a data file, specifying certain fields as required fields, defining certain fields as a primary key or foreign key, and assigning an order to each entity.

In various embodiments, step 332 can include identifying which cells include foreign keys. According to various embodiments, the foreign key service 132 can identify which cells include foreign keys. As will be understood by one having ordinary skill in the art, a foreign key can be a field that links one or more related entities together. According to various embodiments, when a cell includes a foreign key, the foreign key can be associated with the particular entity. Any related entity that is linked to the particular entity via the foreign key can also be identified.

In various embodiments, step 336 can include determining if the one or more related entities (i.e., any entity that is linked to the particular entity via the foreign key) exists in the destination data store. According to various embodiments, the foreign key service 132 can determine if the related entity exists in the destination data store 112. In at least one embodiment, if the related entity exists in the destination data store, the process 300 can proceed to step 348. In at least one embodiment, if the related entity does not exist in the destination data store, the process 300 can proceed to step 340.

In various embodiments, step 340 can include storing the particular entity in a cache. According to various embodiments, the foreign key service 132 can store the particular entity in cache 144. In various embodiments, the particular entity can remain in the cache until the related entity exists in the destination data store.

In various embodiments, step 342 can include aggregating all entities waiting for the same related entity. According to various embodiments, the entities waiting for the same related entity are aggregated in the cache. In various embodiments, the foreign key service 132 or the observation service 140 can aggregate the entities waiting for the same related entity. In at least one embodiment, all the entities with a matching foreign key are aggregated. Alternatively or in addition, all the entities with a matching primary key are aggregated.

In various embodiments, step 344 can include receiving a notification that the related entities exist in the destination data store. According to various embodiments, the observation service 140 can notify the foreign key service 132 that the related entities have been transmitted to the destination data stores 112. In various embodiments, once the related entities have been transmitted to the destination data stores 112, the observation service 140 can check cache 144 to determine if a stored entity was waiting for the related entity to exist in the destination data store 112. In at least one embodiment, the related entities have been transmitted to the destination data store 112 by the external service 114. In various embodiments, once receiving the notification, the stored entities can be released from cache and process 300 can proceed to step 348.

In various embodiments, step 348 can include retrieving the related entities and their primary keys from the destination data store and storing those primary keys in the appropriate cell. According to various embodiments, the foreign key service 132 can retrieve the related entities and their primary keys from the destination data store and store those primary keys in the appropriate cell. In various embodiments, storing the related entity's primary key in the cell allows the destination data store to easily locate the related entity and access the data for the foreign key.

In various embodiments, step 352 can include aggregating the cells into one or more messages. According to various embodiments, the aggregation service 136 can aggregate the cells into one or more messages. In at least one embodiment, all of the cells associated with the same entity are aggregated together into a message. In at least one embodiment, all of the cells associated with the same field are aggregated together into a message.

Referring now to FIG. 4, an exemplary process 400 is shown. The process 400 can include aggregating messages (e.g., in addition to the aggregation performed in step 352 discussed with respect to FIG. 3) and determining if the aggregated messages meet the requirements for transmission to the destination data store.

In various embodiments, step 404 can include extracting the primary keys associated with each entity. In various embodiments, step 408 can include retrieving all the entities from the cache that have primary keys that match the extract primary keys. In various embodiments, step 412 can include aggregating all the messages with matching primary keys. In at least one embodiment, all the entities with matching primary keys can also be aggregated with the messages with matching primary keys. In various embodiments, the aggregation service 136 can extract the primary keys, retrieve the entities with matching primary keys, and aggregate the messages and entities with matching primary keys.

In various embodiments, step 418 can include determining if any of the fields in the messages contain more than one value. In at least one embodiment, the fields do not contain more than one value and process 400 can proceed to step 426. In at least one embodiment, at least one field contains more than one value and process 400 can proceed to step 422. In various embodiments, step 422 can include determining which value in a particular field is associated with the most recent timestamp and excluding all other values from the field. According to various embodiments, after step 422, each field can only contain a single value. According to various embodiments, the aggregation service 136 can determine if any of the fields contain more than one value and exclude all the values associated with older timestamps.

In various embodiments, step 426 can include determining if all required fields are present. As discussed with reference to FIG. 1, each field is either a required field or an optional field. According to various embodiments, the aggregation service 136 can determine if all required fields are present. In at least one embodiment, if all required fields are present, the process 400 can proceed to step 442. In at least one embodiment, if all required fields are not present, the process 400 can proceed to step 430.

In various embodiments, step 430 can include determining if the particular entity already exists in the destination data store. According to various embodiments, the aggregation service 136 can determine if the particular entity already exists in the destination data store 112. In at least one embodiment, if the particular entity already exists in the destination data store, the process 400 can proceed to step 442. In at least one embodiment, if the particular entity does not already exists in the destination data store, the process 400 can proceed to step 434.

In various embodiments, step 434 can include storing the aggregated messages in cache. According to various embodiments, the aggregation service 136 can store the aggregated messages in cache 144. In various embodiments, the aggregated messages can remain in the cache until the aggregated messages meet the requirements for transmission to the destination data store. According to various embodiments, for the aggregated messages to meet the requirements for transmission to the destination data store, either all required fields must be present (i.e., step 426) or the particular entity must already exist in the destination data store (i.e., step 430).

In various embodiments, step 438 can include receiving a notification that the aggregated messages meet the requirements for transmission to the destination data store. According to various embodiments, the aggregation service 136 can receive the notification that the aggregated messages meet the requirements for transmission to the destination data store. In at least one embodiment, the aggregated message will meet the requirements for transmission because the particular entity will exists in the destination data store due to transmission of a different message or by transmission by external service 114. According to various embodiment, the observation service 140 can notify aggregation service 136 when the particular entity exists in the destination data store due to transmission of a different message or by transmission by external service 114. In various embodiments, once receiving the notification, the stored aggregated messages can be released from cache and process 400 can proceed to step 442.

In various embodiments, step 442 can include determining if a threshold amount of time has passed since new aggregated messages for the same entity have been received. In various embodiments, the aggregation service 136 can determine if a threshold amount of time has passed since new aggregated messages for the same entity have been received. In various embodiments, the threshold amount of time can be predetermined or configured (e.g., inputted) by a user. In at least one embodiment, the threshold amount of time will have passed since new aggregated messages for the same entity have been received and process 400 can proceed to step 460. In at least one embodiment, the threshold amount of time will not have passed since new aggregated messages for the same entity have been received and process 400 can proceed to step 446.

In various embodiments, step 446 can include determining if a threshold amount of messages for the same entity have been received. In various embodiments, the aggregation service 136 can determine if a threshold amount of messages for the same entity have been received. In various embodiments, the threshold amount of messages can be predetermined or configured by a user. In at least one embodiment, the threshold amount of messages for the same entity have been received and process 400 can proceed to step 460. In at least one embodiment, the threshold amount of messages for the same entity have been received and process 400 can proceed to step 450.

In various embodiments, step 450 can include storing the aggregated messages in cache until the aggregated messages are ready for transmission to the destination data stores. According to various embodiments, the aggregation service 136 can store the aggregated messages in cache 144. In various embodiments, the aggregated messages can remain in cache until the aggregated messages are ready for transmission to the destination data store. According in various embodiments, for the aggregated messages to be ready for transmission to the destination data store, either the threshold amount of time must have passed since receiving new aggregated messages for the same entity (i.e., step 442) or the threshold amount of messages for the same entity must have been received (i.e., step 446).

In various embodiments, step 438 can include receiving a notification that the aggregated messages are ready for transmission to the destination data store. According in various embodiments, for the aggregated messages to be ready for transmission to the destination data store, either the threshold amount of time must have passed since receiving new aggregated messages for the same entity (i.e., step 442) or the threshold amount of messages for the same entity must have been received (i.e., step 446). According to various embodiments, the aggregation service 136 can receive the notification that the aggregated messages are ready for transmission to the destination data store. According to various embodiment, the observation service 140 can notify aggregation service 136 when the aggregated messages are ready for transmission to the destination data store 112. In various embodiments, once receiving the notification, the stored aggregated messages can be released from cache and process 400 can proceed to step 460. In various embodiments, step 460 can include releasing all aggregated messages for the same entity.

Referring now to FIG. 5, an exemplary process 500 is shown. The process 500 can include excluding, removing, or deleting duplicate entities from the aggregated messages and transmitting the resulting aggregated messages to the destination data store.

In various embodiments, step 504 can include determining that a particular entity in the aggregated messages exists in the destination data store. In various embodiments, the aggregation service 136 can determine if the particular entity in the aggregated messages exists in the destination data store. In at least one embodiment, if the particular entity in the aggregated messages exists in the destination data store, the process 500 can proceed to step 516. In at least one embodiment, if the particular entity in the aggregated messages does not exist in the destination data store, the process 500 can proceed to step 508.

In various embodiments, step 508 can include transmitting the aggregated messages to the destination data store. According to various embodiments, the aggregation service 136 can transmit the aggregated messages to the destination data store 112 via the network 120. In various embodiments, step 512 can include generating and assigning an identifier to the particular entity in the aggregated messages. According to various embodiments, the destination data store 112 can generating and assign an identifier to the particular entity. In various embodiments, the identifier can be assigned to the particular entity based on the particular entity's primary key. In various embodiments, once an entity has been transmitted to the destination data store 112, the external service 114 can access the entity.

In various embodiments, step 516 can include determining if the particular entity is identical to the entity in the destination data store. According to various embodiments, the aggregation service 136 can determine if the particular entity is identical to the entity in the destination data store 112. In various embodiments, the particular entity is identical to the entity in the destination data store if every field between the two entities is identical. In at least one embodiment, if the particular entity is identical to the entity in the destination data store, the process 500 can proceed to step 524. In at least one embodiment, if the particular entity is not identical to the entity, the process 500 can proceed to step 520.

In various embodiments, step 520 can include determining if the particular entity has a more recent timestamp than the timestamp associated with the entity in the destination data store. According to various embodiments, the aggregation service 136 can determine if the particular entity has a more recent timestamp than the timestamp associated with the entity in the destination data store 112. In at least one embodiment, if the particular entity has a more recent timestamp than the timestamp associated with the entity, the process 500 can proceed to step 528. In at least one embodiment, if the particular entity has an older timestamp than the timestamp associated with the entity in the destination data store, the process 500 can proceed to step 524.

In various embodiments, step 524 can include excluding the particular entity from the aggregated messages. According to various embodiments, the aggregation service 136 can exclude the particular entity from the aggregated messages. In various embodiments, step 528 can include transmitting the remaining aggregated messages to the destination data store. According to various embodiments, the aggregation service 136 can transmit the remaining aggregated messages to the destination data store 112 via the network 120. In various embodiments, step 532 can include associating the particular entity with the identifier that is associated with the entity in the destination data store. According to various embodiments, the destination data store 112 can associate the particular entity with the identifier that is associated with the entity in the destination data store. In various embodiments, once an entity has been transmitted to the destination data store 112, the external service 114 can access the entity.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed systems may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed system are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the system is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

Aspects, features, and benefits of the claimed devices and methods for using the same will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the devices and methods for using the same to the precise forms disclosed. Many modifications and variations are possible in light of the above teaching.

The embodiments were chosen and described in order to explain the principles of the devices and methods for using the same and their practical application so as to enable others skilled in the art to utilize the devices and methods for using the same and various embodiments and with various modifications as are suited to the particular use contemplated. Alternative embodiments will become apparent to those skilled in the art to which the present devices and methods for using the same pertain without departing from their spirit and scope. Accordingly, the scope of the present devices and methods for using the same is defined by the appended claims rather than the foregoing description and the exemplary embodiments described therein.

What is claimed is:

1. A method for formatting a unified database, comprising:
    receiving, via at least one computing device, one or more data files, wherein the one or more data files comprise different formats;
    determining, via the at least one computing device, a configuration for a data file from the one or more data files, wherein the data file comprises a particular format of the different formats;
    parsing, via the at least one computing device, the data file into one or more cells;
    associating, via the at least one computing device, each of the one or more cells, which are associated with a first primary key, with a first entity of a plurality of entities, wherein one or more entities of the plurality of entities is linked via one or more respective foreign keys;
    configuring the one or more cells from the particular format into a unified format, via the at least one computing device, based on the configuration;
    extracting, via the at least one computing device, a first key from the one or more cells, wherein the configuration defines a location of the first key in the one or more cells;
    identifying, via the at least one computing device, a dependent entity associated with the data file based on the first key;
    storing, via the at least one computing device, the one or more cells in a cache based on a determination that the dependent entity is not present in a destination data store;
    aggregating the one or more cells into a message, via the at least one computing device, based at least on the dependent entity;
    retrieving from the destination data store, via the at least one computing device, a second primary key associated with the dependent entity;
    storing, via the at least one computing device, the second primary key in the one or more cells;
    associating, via the at least one computing device, the first key with the dependent entity;
    excluding, via the at least one computing device, the first entity from the message; and
    upon determining that the dependent entity has been added to the destination data store, transmitting, via the at least one computing device, the message from the cache to the destination data store, wherein the destination data store comprises the unified database.

2. The method of claim 1, further comprising:
    determining, via the at least one computing device, that a stored entity in the destination data store has a stored primary key that matches the first primary key associated with the first entity.

3. The method of claim 2, further comprising:
    determining, via the at least one computing device, one or more first fields in the first entity are identical to one or more stored fields in the stored entity.

4. The method of claim 2, further comprising:
    determining, via the at least one computing device, a first timestamp associated with the first entity is older than a stored timestamp associated with the stored entity.

5. The method of claim 1, wherein the data file is associated with the first entity, the dependent entity comprises required data associated with the first entity, and determining that the dependent entity has been added to the destination data store further comprises determining that the required data associated with the first entity has been added to the destination data store.

6. A system for formatting a unified database comprising:
one or more processors;
a destination data store;
at least one computing device in communication with the destination data store, wherein the at least one computing device is configured to:
receive one or more data files, wherein the one or more data files comprise different formats;
determine a configuration for a data file from the one or more data files, wherein the data file comprises a particular format of the different formats;
parse the data file into one or more cells;
associate each of the one or more cells, which are associated with a first primary key, with a first entity of a plurality of entities, wherein one or more entities of the plurality of entities is linked via one or more respective foreign keys;
configure the one or more cells from the particular format into a unified format based on the configuration;
extract a first key from the one or more cells, wherein the configuration defines a location of the first key in the one or more cells;
identify a dependent entity associated with the data file based on the first key;
store the one or more cells in a cache based on a determination that the dependent entity is not present in the destination data store;
aggregate the one or more cells into a message based at least on the dependent entity;
retrieve from the destination data store a second primary key associated with the dependent entity;
store the second primary key in the one or more cells;
associate the first key with the dependent entity;
exclude the first entity from the message; and
upon determining that the dependent entity has been added to the destination data store, transmit the message from the cache to the destination data store, wherein the destination data store comprises the unified database.

7. The system of claim 6, wherein the at least one computing device is further configured to:
associate a timestamp with each cell in the message.

8. The system of claim 7, wherein the at least one computing device is further configured to:
determine a field in the message includes two or more values, wherein the two or more values are associated with the one or more cells.

9. The system of claim 8, wherein the at least one computing device is further configured to:
determine a value of the two or more values is associated with a most recent timestamp;
determine one or more older values of the two or more values are associated with older timestamps; and
exclude the one or more older values from the two or more values.

10. The system of claim 7, wherein the at least one computing device is further configured to:
retrieve a second entity with the second primary key that matches the first primary key; and
aggregate the second entity with the message.

11. The system of claim 7, wherein the at least one computing device is further configured to:
assign an identifier to the first entity based at least in part on the first primary key.

12. A non-transitory computer-readable medium for formatting a unified database and embodying a program that, when executed by one or more processors of at least one computing device, causes the at least one computing device to:
receive one or more data files, wherein the one or more data files comprise different formats;
determine a configuration for a data file from the one or more data files, wherein the data file comprises a particular format of the different formats;
parse the data file into one or more cells;
associate each of the one or more cells, which are associated with a first primary key, with a first entity of a plurality of entities, wherein one or more entities of the plurality of entities is linked via one or more respective foreign keys;
configure the one or more cells from the particular format into a unified format based on the configuration;
extract a first key from the one or more cells, wherein the configuration defines a location of the first key in the one or more cells;
identify a dependent entity associated with the data file based on the first key;
store the one or more cells in a cache based on a determination that the dependent entity is not present in a destination data store;
aggregate the one or more cells into a message based at least on the dependent entity;
retrieve from the destination data store, via the at least one computing device, a second primary key associated with the dependent entity;
store the second primary key in the one or more cells;
associate the first key with the dependent entity;
exclude the first entity from the message; and
upon determining that the dependent entity has been added to the destination data store, transmit the message to a destination data store, wherein the destination data store comprises the unified database.

13. The non-transitory computer-readable medium of claim 12, wherein the program further causes the at least one computing device to:
prior to transmitting the message to the destination data store, determine that a required field is not present; and
store the message in the cache.

14. The non-transitory computer-readable medium of claim 13, wherein the program further causes the at least one computing device to:
upon determining that the required field is present, retrieve the message from the cache.

15. The non-transitory computer-readable medium of claim 12, wherein the program further causes the at least one computing device to:
determine that the first entity is dependent on the dependent entity.

16. The non-transitory computer-readable medium of claim 12, wherein the program further causes the at least one computing device to:
aggregate the message with a plurality of messages into an aggregate of messages based at least in part on the first primary key.

* * * * *